(12) United States Patent
Mushing et al.

(10) Patent No.: US 11,392,925 B2
(45) Date of Patent: Jul. 19, 2022

(54) METHOD AND SYSTEM FOR CONTACTLESS TRANSMISSIONS USING OFF-THE-SHELF DEVICES

(71) Applicant: MASTERCARD INTERNATIONAL INCORPORATED, Purchase, NY (US)

(72) Inventors: Alan Mushing, Cheshire (GB); Fernando Lourenco, Congleton (GB); Bruce John Rutherford, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/382,338

(22) Filed: Apr. 12, 2019

(65) Prior Publication Data
US 2019/0318342 A1     Oct. 17, 2019

Related U.S. Application Data

(60) Provisional application No. 62/657,241, filed on Apr. 13, 2018.

(51) Int. Cl.
*G06Q 20/32* (2012.01)
*H04L 9/30* (2006.01)
(Continued)

(52) U.S. Cl.
CPC ....... *G06Q 20/3278* (2013.01); *G06Q 20/206* (2013.01); *G06Q 20/36* (2013.01); *H04L 9/30* (2013.01)

(58) Field of Classification Search
CPC ............. G06Q 20/3278; G06Q 20/206; G06Q 20/306; G06Q 40/00; H04L 9/30
(Continued)

(56) References Cited

U.S. PATENT DOCUMENTS

2009/0254572 A1\* 10/2009 Redlich ................. G06Q 10/06
2009/0292894 A1    11/2009 Henry et al.
(Continued)

FOREIGN PATENT DOCUMENTS

EP      2 876 592 A1    5/2015

OTHER PUBLICATIONS

Notification of Transmittal of the International Search Report and the Written Opinion of the International Searching Authority (Forms PCT/ISA/220, PCT/ISA/210 and PCT/ISA/237) dated Aug. 2, 2019, by the Korean Intellectual Property Office in corresponding International Application No. PCT/US2019/027128. (12 pages).
(Continued)

*Primary Examiner* — Christopher Bridges
*Assistant Examiner* — Timothy T. Hsieh
(74) *Attorney, Agent, or Firm* — Panitch Schwarze Belisario & Nadel LLP

(57) ABSTRACT

A method for secured receipt and usage of payment credentials using a commercial-off-the-shelf (COTS) device includes: storing, in the COTS device, a secure application program and cryptographic keys; establishing, by the program, a secure communication channel with a back-end system inaccessible by any application program or component in the COTS device; exchanging attestation data between the program and the back-end system using the communication channel; receiving payment credentials from a payment card by a near field communication (NFC) interface in the COTS device; transmitting the payment credentials to the program by the NFC interface; enciphering, by the program, the payment credentials; and transmitting, by the program of the COTS device, the enciphered payment credentials to the back-end system using the secure communication channel.

14 Claims, 5 Drawing Sheets

(51) Int. Cl.
  *G06Q 20/20* (2012.01)
  *G06Q 20/36* (2012.01)
(58) Field of Classification Search
  USPC .................................................. 705/35, 39
  See application file for complete search history.

(56) References Cited

U.S. PATENT DOCUMENTS

| | | | | |
|---|---|---|---|---|
| 2010/0306107 | A1* | 12/2010 | Nahari | G06Q 20/40 |
| | | | | 235/375 |
| 2011/0010720 | A1* | 1/2011 | Smith | G06F 21/00 |
| | | | | 718/102 |
| 2011/0191252 | A1 | 8/2011 | Dai | |
| 2012/0102334 | A1* | 4/2012 | O'Loughlin | H04L 9/0877 |
| | | | | 713/189 |
| 2012/0124365 | A1* | 5/2012 | Black | G07F 7/00 |
| | | | | 726/19 |
| 2013/0333008 | A1* | 12/2013 | Tapling | H04L 63/0853 |
| | | | | 726/7 |
| 2014/0161258 | A1 | 6/2014 | Yang et al. | |
| 2016/0117519 | A1* | 4/2016 | Hashii | G06F 16/183 |
| | | | | 713/166 |
| 2016/0249189 | A1* | 8/2016 | Marlow | H04W 12/02 |
| 2016/0366120 | A1* | 12/2016 | Rykowski | H04L 63/0815 |
| 2017/0091752 | A1 | 3/2017 | du Chéné et al. | |

OTHER PUBLICATIONS

Na: "Payment Card Industry (PCI) Software-based PIN Entry on COTS Security Requirements", (Jan. 31, 2018), XP055627362, Retrieved from the Internet:URL:https://www.pcisecuritystandards.org/documents/SPoC_Security_Requirements_v1.0.pdf?agreement=true&time=1569851789111. [retrieved on Sep. 30, 2019]. (102 pages).

Extended European Search Report dated Dec. 7, 2021, by the European Patent Office in corresponding European Patent Application No. 19784622.3-1213. (11 pages).

* cited by examiner

METHOD AND SYSTEM FOR CONTACTLESS TRANSMISSIONS USING OFF-THE-SHELF DEVICES

FIELD

The present disclosure relates to the secured receipt and usage of payment credentials using a commercial-off-the-shelf (COTS) device, specifically the use of a back-end system and attestation to enable a COTS device to accept payment credentials using native near field communication capabilities of the device without sacrificing account security.

BACKGROUND

Traditional point of sale devices are specialized computing machines that can often be expensive to purchase and difficult to set up and use, particularly for small businesses. As such, many individuals or small operations that are interested in selling a product will often stick to cash transactions, lacking a point of sale system for the reading and processing of credit cards and other payment instruments. In an effort to facilitate these types of transactions for small businesses, products have been developed that can convert a traditional computing device, such as a desktop computer, tablet computer, or smart phone, into a point of sale devices. Typically, these products utilize a specialized hardware element that is interfaced with the computing device, such as through a charging port or audio port, as well as an application program loaded on and executed by the computing device that can act as an interface between the make and model and software version of the traditional computing device, which is rife with technological challenges to create, install and maintain.

Hence, the use of such a hardware element often requires a significant commitment by the small business and vendors who might support them. The small business must purchase and maintain their own computing device that will be converted to a point of sale, but must also purchase and maintain the additional hardware element that is used to convert the computing device. This additional hardware element will use a specific interface to connect to the computing device, which may be phased out or otherwise changed by the computing device manufacturer, requiring the small business to either withhold from ever upgrading their computing device, or always purchasing a new hardware element any time they want to upgrade their computing device. Further, there can be a myriad of requirements with a multitude of permutations to cover a sufficient number of variations in hardware, software and interfaces. As a result, conversion of a computing device to a point of sale through a hardware element is often very time consuming, requires specialized software and hardware, requires knowledgeable installation and maintenance, and is a very financially expensive process.

Thus, there is a need for a technological system that can enable a small business to convert a COTS device to a point of sale, without compromise of any payment credentials gathered therewith and while successfully processing payment transactions without the need for additional hardware to be purchased or maintained by the small business.

SUMMARY

The present disclosure provides a description of systems and methods for secured receipt and usage of payment credentials using a commercial-off-the-shelf (COTS) device. The COTS device is provided a secure application program that is inaccessible by any other program or component in the COTS device, to where the program is configured to terminate and destroy all payment information and to cease processing transactions as determined by the back end monitoring system if any attempt to access the program is made by another program or component, or if the operation of the device is changed in any way. The secure application program establishes a secure connection with a back-end system, which is used to perform attestation of the device, ensuring security is maintained and no compromise has been made. Native near field communication capabilities of the COTS device are used to receive payment credentials from a payment card, which are then securely passed to the secure application program. The secure application program enciphers the payment credentials and funnels them to the back-end system through the secure channel, and then deletes any data related to the payment credentials. The back-end system can proceed with the transaction. As a result, the COTS device has been used as a point of sale device on behalf of the small business, without the need for any additional hardware, and while posing no threat to the payment credentials being gathered. Thus, any small business could turn any COTS device into a point of sale device through use of the secure application program and back-end system as discussed herein, with no need for additional hardware elements or physical modifications to their COTS device.

A method for secured receipt and usage of payment credentials using a commercial-off-the-shelf (COTS) device includes: storing, in a memory of the COTS device, a secure application program and one or more cryptographic keys, where the cryptographic keys are accessible using the secure application program and inaccessible by any other application program or component in the COTS device; establishing, by the secure application program in the COTS device, a secure communication channel with a back-end system, where the secure communication channel is inaccessible by any other application program or component in the COTS device; exchanging, by the secure application program in the COTS device, attestation data with the back-end system using the communication channel; receiving, by a near field communication interface of the COTS device, payment credentials from a payment card position within a predetermined distance of the COTS device; transmitting, by the near field communication interface of the COTS device, the payment credentials to the secure application program; enciphering, by the secure application program of the COTS device, the payment credentials; and transmitting, by the secure application program of the COTS device, the enciphered payment credentials to the back-end system using the secure communication channel.

A system for secured receipt and usage of payment credentials using a commercial-off-the-shelf (COTS) device includes: a back-end system; and the COTS device, where the COTS device includes a memory and a near field communication interface, wherein the memory of the COTS device stores a secure application program and one or more cryptographic keys, where the cryptographic keys are accessible using the secure application program and inaccessible by any other application program or component in the COTS device, the secure application program in the COTS device establishes a secure communication channel with a back-end system, where the secure communication channel is inaccessible by any other application program or component in the COTS device, and exchanges attestation data with the back-end system using the communication channel, the near field communication interface of the COTS device receives payment credentials from a payment card position within a predetermined distance of the COTS device, and transmits the payment credentials to the secure application program, and the secure application program of the COTS device enciphers the payment credentials, and transmits the enciphered payment credentials to the back-end system using the secure communication channel.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
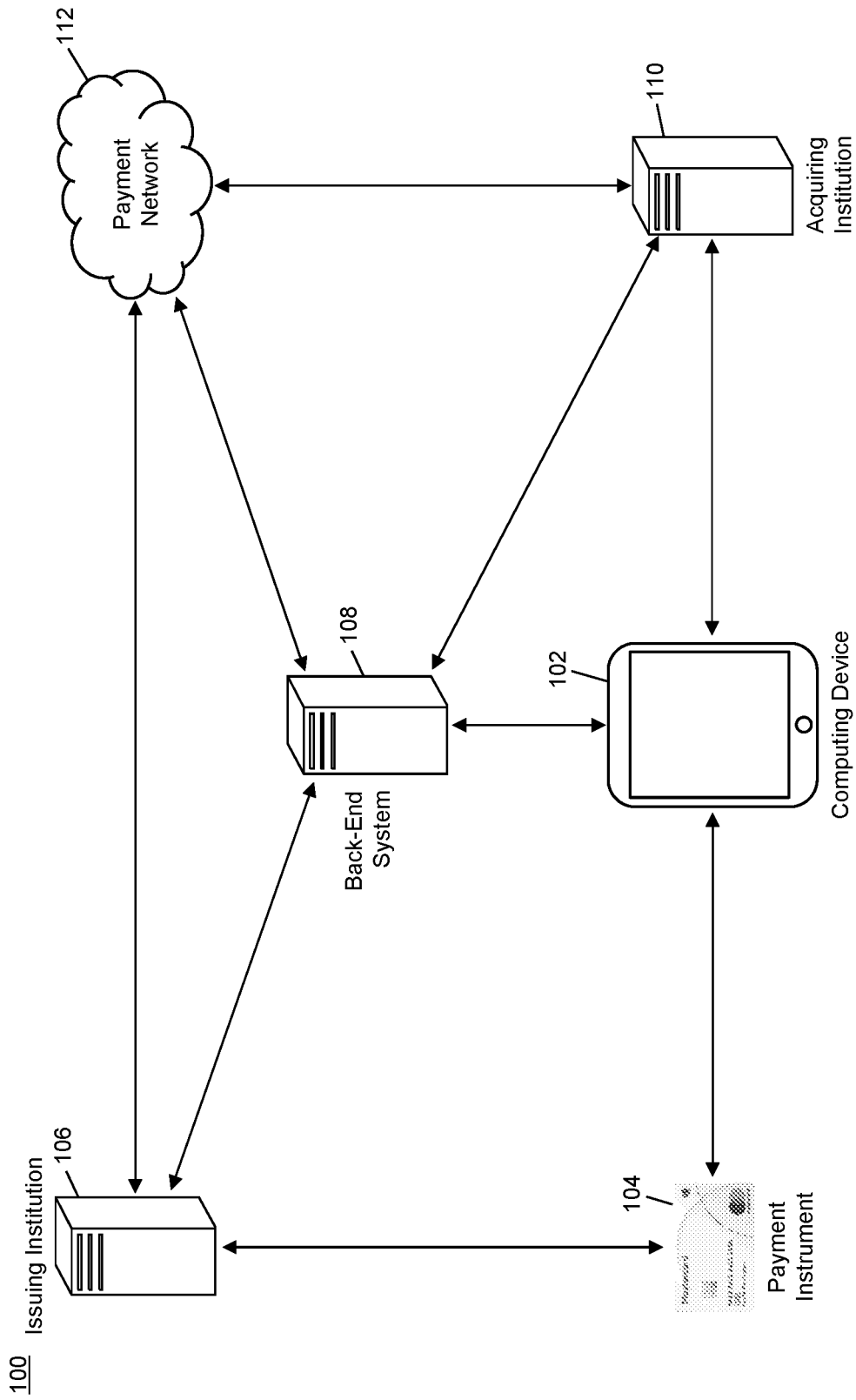
FIG. 1 is a block diagram illustrating a high level system architecture for usage of payment credentials in a COTS device in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transactions may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above are performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for Secured Usage of Payment Credentials in a COTS Device

FIG. 1 illustrates a system 100 for the secured receipt and usage of payment credentials in a commercial-off-the-shelf (COTS) device without the need for additional hardware elements.

The system 100 may include a computing device 102. The computing device 102, discussed in more detail below, may start out as a traditional computing device, a COTS device, but is specially configured and programmed as discussed herein to operate as a point of sale device for the processing of an electronic payment transaction. The computing device 102 may be, for example, a specifically configured desktop computer, laptop computer, notebook computer, tablet computer, cellular phone, smart phone, smart television, etc. The computing device 102 may be any suitable type of device that has a near field communication (NFC) interface for receiving data from a payment instrument 104 using NFC. The computing device 102 may be a COTS device that has NFC capabilities that has been loaded with a secure application program, as discussed in more detail below.

In the system 100, an issuing institution 106 may issue a payment instrument 104 to a consumer for use in funding electronic payment transactions. The payment instrument 104 may be associated with a transaction account that is issued to the consumer and may include an integrated circuit or other processing device with a memory that stores payment credentials associated with the related transaction account. The payment credentials may include any data necessary for use in processing a payment transaction that is funded using the related transaction account, such as a primary account number, expiration date, security code, application transaction counter, name, payment cryptogram, etc. The payment instrument 104 may be any type of instrument that has the capability of transmitting the payment credentials stored therein using NFC, such as an integrated circuit payment card or a smart phone.

The system 100 may also include a back-end system 108. The back-end system 108 may be a computing system that is specially configured to perform attestation of the computing device 102 and assist in the initiation and processing of payment transactions on behalf thereof. In the system 100, the computing device 102 may have a secure application program installed therein, which may be configured to communicate with the back-end system 108. The secure application program 108 may be stored in a memory of the computing device 102 and be executed by a processor of the computing device 102 and be used to communicate with the back-end system 108 to convey payment credentials thereto. In some embodiments, the secure application program may be stored in a trusted execution environment (TEE) of the computing device 102, such as a Secure Element. In other embodiments, the secure application program may be stored in a traditional memory.

The secure application program may be configured to be executed by the processor and be kept secure from any other program or component in the computing device 102. For instance, if the secure application program detects any interruption event, the instance of the secure application program may be immediately terminated, and any captured data deleted. An interruption event may be any event that may remove focus from the secure application program or that attempts to collect data from the secure application program. For example, an attempted minimization of the secure application program, loading of an alternative application program, accessing of data being used by the secure application program, access to the NFC interface of the computing device 102, etc. may be considered an interruption event by the secure application program. The secure application program may be configured such that any data received or otherwise obtained by the secure application program once an instance of the secure application program has been created (e.g., via execution of the secure application program's program code by the computing device's processor) will be deleted upon termination of the secure application program, thereby preventing access to the data by any other program or component of the computing device 102.

As part of the initialization of the secure application program on the computing device 102, during the installation and/or registration process of the secure application program, the back-end system 108 may provide one or more cryptographic keys to the computing device 102 for use solely by the secure application program, which may be stored as part of the program code or a section of memory only accessible by the secure application program. The cryptographic keys may be any type of keys that are used in enciphering, encrypting, or otherwise protecting data or used in attestation and proof of identity in communications exchanged between the computing device 102 and the back-end system 108. For instance, in one example, cryptographic key pairs may be used where each of the computing device 102 and back-end system may provide the other with a public key and retain the private key for the respective key pair. In another example, salts may be exchanged for use as a cryptographic key.

Once the computing device 102 has the secure application program installed thereon and initialized with the back-end system 108, a user of the computing device 102 (e.g., a small business owner or operator) may utilize the computing device 102 as a point of sale device for an electronic payment transaction. The user may instruct the computing device 102 to execute the secure application program to begin an instance thereof. The secure application program may then being monitoring for any interruption events that may result in termination of the secure application program, or may otherwise continue operation. The secure application program may present the user with a number of options, such as for the entering of account information for a transaction account issued by an acquiring institution 110 that is to be used by the small business to receive funds for electronic payment transactions involving the small business. The secure application program may also present the user with an option to initiate the receipt of payment credentials for initiation of a payment transaction. Upon selection of this option, the secure application program may instruct an NFC interface of the computing device 102 to monitor for and receive payment credentials using NFC.

When the NFC interface is monitoring for payment credentials, the consumer may move their payment instrument 104 within a predetermined distance of the computing device 102 suitable for communication via NFC. In some cases, the consumer may be required to first initiate transmission on their payment instrument 104 before payment credentials may be exchanged. The NFC interface and payment instrument 104 may establish a communication channel, and the payment instrument 104 may convey the payment credentials stored therein to the NFC interface of the computing device 102 using the communication channel.

The NFC interface in the computing device 102 may receive the payment credentials and transmit them to the secure application program. In an exemplary embodiment, the NFC interface may be prohibited from conveying payment credentials to any other program or component of the computing device 102. In such embodiments, attempted access to the payment credentials by any other program or component may result in immediate deletion of the data and, in some cases, termination of the instance of the secure application program. In some embodiments, the NFC interface may be able to receive other data for other application programs, but may be prohibited from receiving payment credentials unless instructed by the secure application program. In other embodiments, the NFC interface may only be accessible by the secure application program, where other application programs that may wish to use NFC may be required to go through the secure application program to obtain such data, which may be passed through the secure application program from the NFC interface.

Once the secure application program has received the payment credentials, they may be communicated to the back-end system 108 via a secure communication channel. In some embodiments, the secure communication channel may be established with the back-end system prior to obtaining the payment credentials using the NFC interface. In other embodiments, the secure communication channel may be established once payment credentials have been received, where the payment credentials may be immediately deleted if establishing of the secure communication channel fails. The computing device 102 and back-end system may establish the secure communication channel using any suitable method, such as through the exchange of keys or data generated thereby or otherwise associated therewith, such as the use of shared secrets, to establish proof of identity with each other. The secure communication channel may utilize any suitable communication method and protocol and may be such that the communications made therewith are enciphered or otherwise encrypted such that they may be unobtainable or indecipherable by any other entity or device. In an exemplary embodiment, any attempted use of the secure communication channel or access to data transmitted or received thereby by any other program or component in the computing device 102 may be interpreted by the secure application program as an interruption event, resulting in immediate termination of the instance of the secure application program (and also the secure communication channel as a result) and deletion of any data obtained by the secure application program or NFC interface.

Once the secure communication channel is established, the back-end system 108 may perform attestation of the computing device 102. Attestation of the computing device 102 may be used to evaluate the integrity and security of the computing device 102, such as to ensure that the secure application program and NFC interface have not been tampered with or compromised, to ensure the security of the secure application program and any payment credentials captured for use in the methods and systems discussed herein. Any suitable method of attestation may be used, such as where the secure application program and/or separate attestation element of the computing device 102 may be a prover and the back-end system 108 and/or separate attestation element in the secure application program or computing device 102 may be a verifier.

If establishment of the secure communication channel is unsuccessful or if attestation of the computing device 102 fails, the instance of secure application program may be immediately terminated and any data generated during operation of the instance or received by the NFC interface may be immediately deleted without any opportunity for access by other application programs or components of the computing device 102. If the secure communication channel is successfully established and attestation of the computing device 102 and/or secure application program is successful, then the computing device 102 may encipher the received payment credentials if already received, or may instruct the NFC interface that it is allowed to monitor for payment credentials over NFC. Payment credentials may be enciphered by the secure application program using at least one of the cryptographic keys created or otherwise obtained during the initialization process with the back-end system 108. The enciphered payment credentials may be then transmitted to the back-end system 108 by the secure application program using the established secure communication channel.

Once the back-end system 108 obtains the enciphered payment credentials, the back-end system 108 may decipher the payment credentials using its own cryptographic key(s) and/or any other data as will be available to the back-end system 108 following initialization of the secure application program and establishment of the secure communication channel, such as session keys, shared secrets, salts, nonces, etc. The deciphered payment credentials may then be used in an electronic payment transaction that will be processed for payment of a transaction amount from the consumer's transaction account, identified using the payment credentials, to a transaction account of the merchant operating the computing device 102, as may be included in a transmission to the back-end system 108, such as during initialization of the secure application program or along with the enciphered payment credentials.

In one embodiment, the back-end system 108 may transmit the payment credentials and any other transaction data provided by the computing device 102 (e.g., transaction amount, currency type, transaction time and/or date, geographic location, reward data, loyalty data, offer data, etc.) to the acquiring institution 110, where the acquiring institution 110 may generate a transaction message for the payment transaction that is submitted to a payment network 112 via payment rails associated therewith for processing. In other embodiments, the back-end system 108 may generate the transaction message directly using the deciphered payment credentials and transaction data, and submit the transaction message directly to the payment network 112 via the payment rails associated therewith on behalf of the acquiring institution 110. The payment network 112 may then process the payment transaction using traditional methods and systems, where the resulting authorization response may be provided to the acquiring institution 110 or back-end system 108, as applicable. The result of the transaction processing, indicating approval or decline of the payment transaction, may be provided to the computing device 102 by the back-end system 108 (e.g., using the secure communication channel) or the acquiring institution 110, and the transaction may then be finalized by the computing device 102, such as by displaying the result to the consumer and/or user of the computing device 102 and the purchased product(s) furnished to the consumer accordingly.

In some embodiments, the secure application program may be configured to store and maintain an audit log. The audit log may be a log comprised of entries that detail each action performed by the secure application program or another device or component of the computing device 102 performed on behalf thereof (e.g., the NFC interface, an attestation program, etc.). The audit log may, for example, include entries for each time a secure communication channel is established, payment credentials are received, payment credentials are enciphered, session keys are generated, etc. The audit log may be used by the back-end system 108 in attestation of the computing device 102 or other action related to the verification of the security and genuineness of the secure application program and the computing device 102.

The methods and systems discussed herein enable a COTS device, the computing device 102, to operate as a point of sale device for a small business for the secure receipt and usage of payment credentials obtained using NFC. Through use of the secure application program and back-end system, the computing device 102 can be used as a point of sale device for NFC transactions without the need for any additional hardware elements, which enables a small business to begin accepting contactless payments with a significantly smaller startup cost than traditional methods, and without the need for the small business to continually buy new hardware elements any time they want to upgrade their computing device 102 or improve the capabilities or security thereof.

Computing Device

Figure 2:
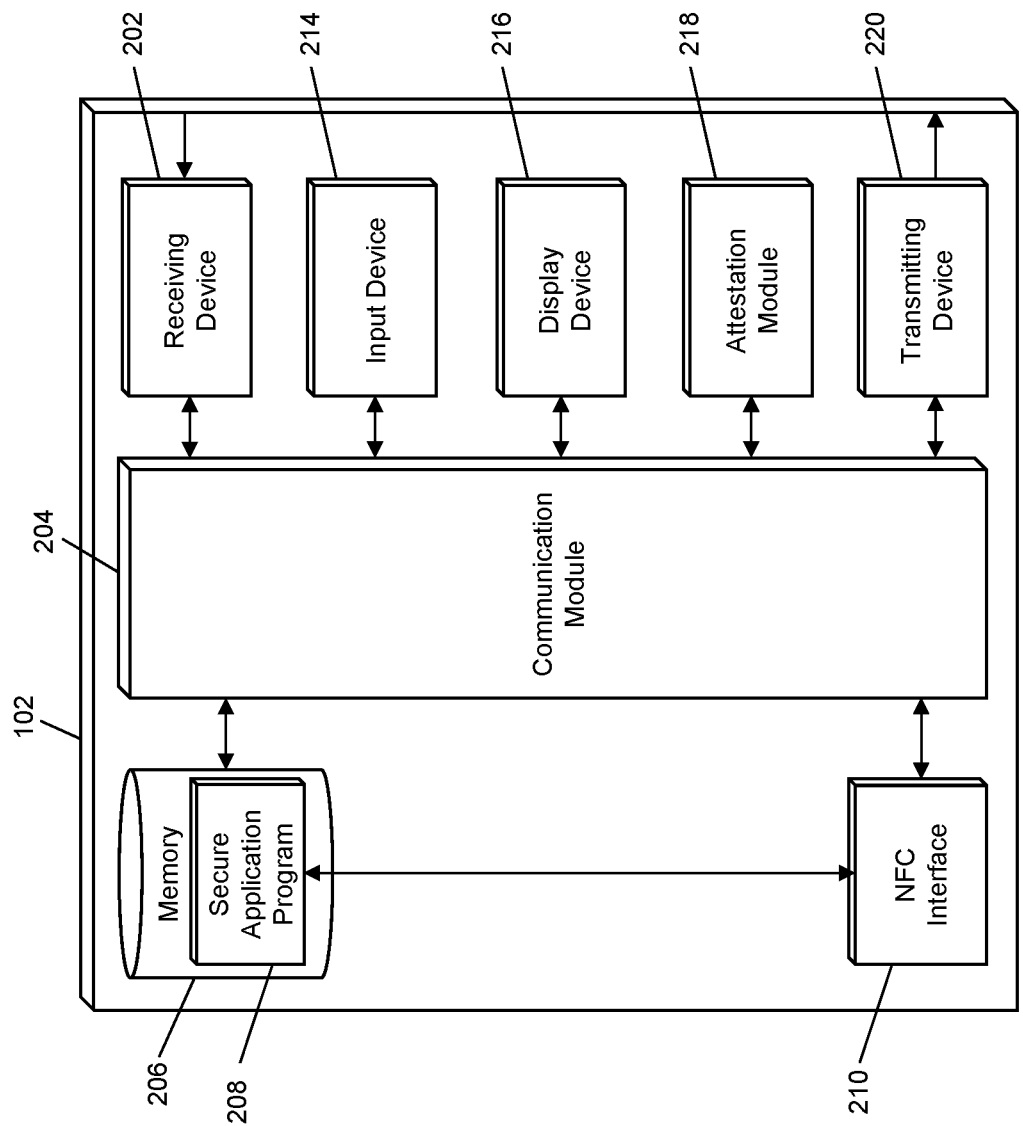
FIG. 2 is a block diagram illustrating the computing device of the system of FIG. 1 for secure receipt and usage of payment credentials in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 500 illustrated in FIG. 5 and discussed in more detail below may be a suitable configuration of the computing device 102. In some cases, the back-end system 108 in the system 100 may be configured similar to the computing device 102 in FIG. 2 or computer system 500 in FIG. 5, such as including the components illustrated therein.

The computing device 102 may include a receiving device 202. The receiving device 202 may be configured to receive data over one or more networks via one or more network protocols. In some instances, the receiving device 202 may be configured to receive data from payment instruments 104, back-end systems 108, acquiring institutions 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by back-end systems 108 that are superimposed or otherwise encoded with cryptographic keys or other data associated therewith for use in establishing and/or maintaining secure communication channels, enciphering and/or deciphering communications, and performing attestation of the computing device 102 and secure application program. In some cases, any communications received from the back-end system 108 aside from those used in forming the secure communication channel may be made using the secure communication channel. In some instances, all communications received from back-end systems 108 may be enciphered or otherwise encrypted. The receiving device 202 may also be configured to receive data signals electronically transmitted by acquiring institutions 110, such as may be superimposed or otherwise encoded with account information, authorization responses, or other data as discussed herein.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as an attestation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may also include a memory 206. The memory 206 may be configured to store data for use by the computing device 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, cryptographic keys, salts, nonces, communication information for the back-end system, etc.

The memory 206 may include the secure application program 208. The secure application program 208, as discussed herein, may be configured to enable the computing device 102, as a COTS device, to operate as a point of sale device for contactless payment transactions, without the need for additional hardware elements. The secure application program 208 may be configured to monitor for interruption events in the computing device 102 and may immediately terminate an instance of the secure application program 208 if such an event is detected, and may also delete any data obtained during operation of the secure application program 208. In an exemplary embodiment, the secure application program may not operate a local data cache of any data obtained, and/or may delete any cached data upon completion of functions by the secure application program or during termination of the instance of the secure application program.

The computing device 102 may also include an NFC interface 210. The NFC interface 210 may be configured to receive and transmit data to devices external to the computing device 102 using NFC. The NFC interface 210 may be configured such that any payment credentials received using NFC may be transmitted only to the secure application program 208 in the computing device 102, where such data may be inaccessible by any other application program or component. In some cases, the NFC interface 210 may only be operated by the secure application program 208. For instance, the NFC interface 210 may be prohibited from transmitting or receiving data unless instructed by the secure application program 208, where any communication may be immediately stopped and any data obtained deleted upon the detection of an interruption event by the secure application program 208.

The computing device 102 may also include or be otherwise interfaced with one or more input devices 214. The input devices 214 may be internal to the computing device 102 or external to the computing device 102 and connected thereto via one or more connections (e.g., wired or wireless) for the transmission of data to and/or from. The input devices 214 may be configured to receive input from a user of the computing device 102, which may be provided to another module or engine of the computing device 102 (e.g., via the communication module 204) for processing accordingly. Input devices 214 may include any type of input device suitable for receiving input for the performing of the functions discussed herein, such as a keyboard, mouse, click wheel, scroll wheel, microphone, touch screen, track pad, camera, optical imager, etc. The input device 214 may be configured to, for example, receive account information for a transaction account issued by the acquiring institution 110 for use in receiving funds, instructions to initiate receipt of payment credentials via NFC, transaction amounts or other transaction data, etc.

The computing device 102 may also include or be otherwise interfaced with a display device 216. The display device 216 may be internal to the computing device 102 or external to the computing device 102 and connected thereto via one or more connections (e.g., wired or wireless) for the transmission of data to and/or from. The display device 216 may be configured to display data to a user of the computing device 102. The display device 216 may be any type of display suitable for displaying data as part of the functions discussed herein, such as a liquid crystal display, light emitting diode display, thin film transistor display, capacitive touch display, cathode ray tube display, light projection display, etc. In some instances, the computing device 102 may include multiple display devices 216. The display device 216 may be configured to, for example, display instructions to the user of the computing device 102 and/or the consumer, data entry prompts, result information for an attempted payment transaction, etc.

The computing device 102 may also include an attestation module 218. The attestation module 218 may be configured to perform functions related to attestation of the computing device 102 and/or secure application program 208 by the back-end system 108. In some cases, the attestation module 218 may be a part of the secure application program 208. In other cases, the attestation module 218 may be implemented as a different application program in the computing device 102 (e.g., stored in the memory 206), which may be in communication with the secure application program 208 and configured to communicate with the back-end system 108. In some instances, the attestation module 218 may be configured to utilize the secure communication channel established with the back-end system 108. Functions performed by the attestation module 218 may be dependent on the type of attestation being performed, as will be apparent to persons having skill in the relevant art.

The computing device 102 may also include a transmitting device 220. The transmitting device 220 may be configured to transmit data over one or more networks via one or more network protocols. In some instances, the transmitting device 220 may be configured to transmit data to back-end systems 108, acquiring institutions 110, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to back-end systems 108 via the secure application program 208 that are superimposed or otherwise encoded with data used to establish a secure communication channel or other data that is transmitted using the secure communication channel, which may include enciphered payment credentials, transaction data, attestation data, or other data as discussed herein. The transmitting device 220 may also be configured to electronically transmit data signals to acquiring institutions 110 that are superimposed or otherwise encoded with requests for account information, additional transaction data, confirmation of authorization response data, etc.

Process for Secure Usage of Payment Credentials

Figure 3:
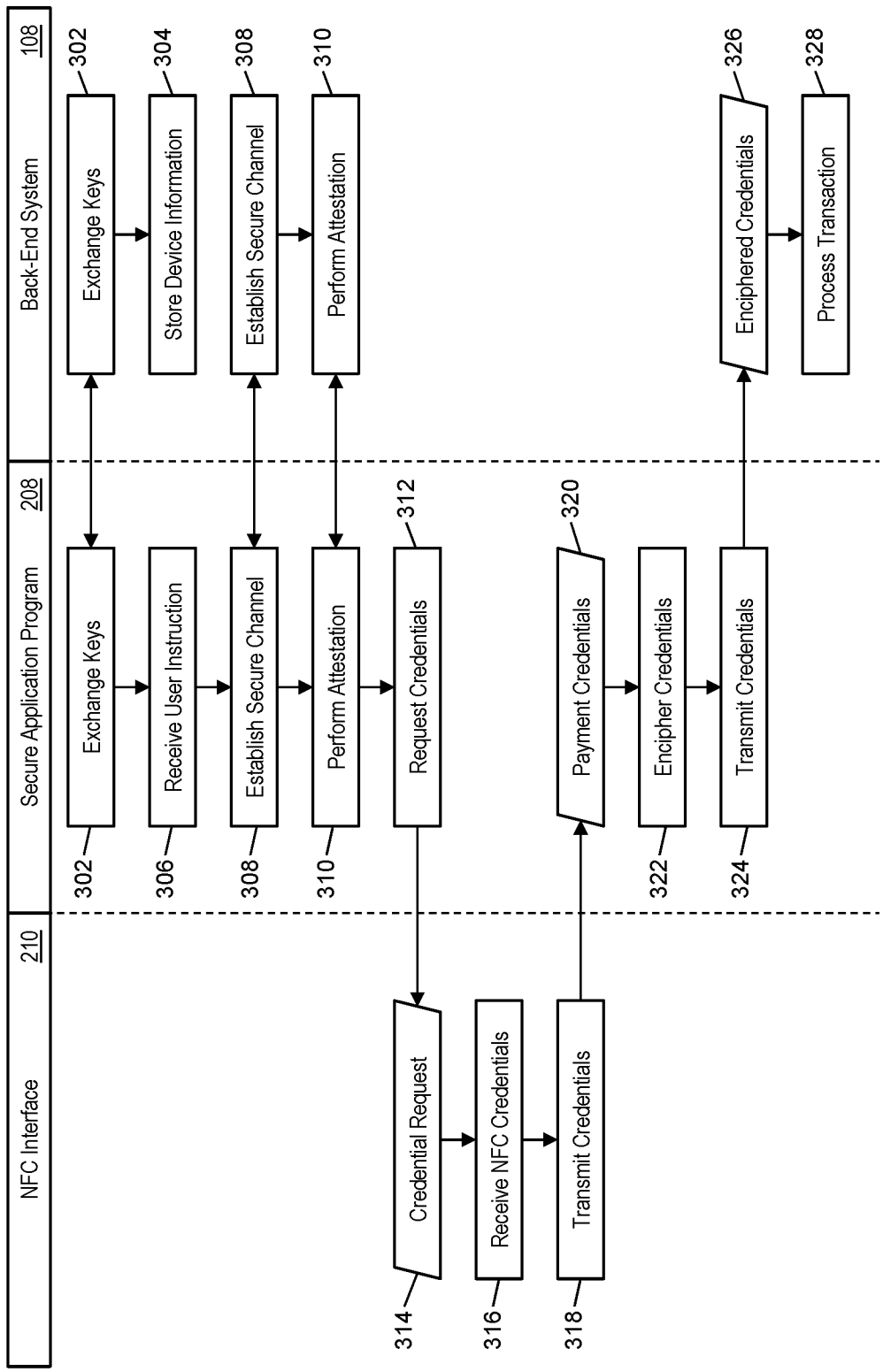
FIG. 3 is a flow diagram illustrating a process for secured receipt and usage of payment credentials using a COTS device in the system of FIG. 1 in accordance with exemplary embodiments.

FIG. 3 illustrates an example process executed in the system 100 of FIG. 1 for the secure receipt and usage of payment credentials via contactless NFC transmission utilizing the secure application program 208 in a COTS computing device 102 for an electronic payment transaction.

In step 302, the secure application program 208 and the back-end system 108 may exchange cryptographic keys and other data during an initialization process, which may include any data used in the establishing of secure communication channels and performing attestation of the secure application program 208. In step 304, the back-end system 108 may store information received from the secure application program 208 related to the program and the computing device 102 that will be used in the receipt of communications therefrom, deciphering thereof, and attestation of the secure application program 208 and computing device 102.

In step 306, the secure application program 208 may receive an instruction input into the computing device 102 by the user using the input device 214 instructing the secure application program 208 to execute and begin the process for operation as a point of sale device for an electronic payment transaction. In step 308, the secure application program 208 and back-end system 108 may establish a secure communication channel. The secure communication channel may utilize any suitable communication method and protocols, where the communications may be enciphered or otherwise encrypted such that unauthorized devices may be unable to decipher or otherwise decrypt the data even if intercepted. Any suitable method for establishing the secure communication channel may be used. In step 310, attestation may be performed between the secure application program 208 and the back-end system 108. The attestation may involve a check by the back-end system 108 to determine if the secure application program 208 is secure and has not been compromised or tampered with, and if the computing device 102 itself and/or the NFC interface 210 or other additional components of the computing device have not been compromised or tampered with. In some cases, the computing device 102 may include an attestation module 218 for use in performing the attestation with the back-end system 108.

Once the secure communication channel has been established and the secure application program 208 determined to be secure and genuine, then, in step 312, the secure application program 208 may instruct the NFC interface 210 of the computing device 102 to obtain payment credentials from a payment instrument 102 using NFC. In step 314, the NFC interface 210 may receive the instruction from the secure application program 208. In step 316, the NFC interface may receive payment credentials from a payment instrument 104 that is within a predetermined distance of the computing device 102 via NFC. The payment credentials may include a primary account number and any additional data stored in the payment instrument 104 that is used in the processing of a payment transaction funded using a transaction account related to the payment instrument 104. In step 318, the NFC interface may securely transmit the received payment credentials to the secure application program 208 in the computing device 102, where any detected intercept of the transmission may result in immediate deletion of the data and/or termination of the instance of the secure application program 208.

In step 320, the secure application program 208 may receive the payment credentials from the NFC interface 210. In step 322, the secure application program 208 may encipher the received payment credentials using one or more of the cryptographic keys or other data obtained and/or generated by the secure application program 208 during the initialization process of step 302. In step 324, the enciphered payment credentials may be transmitted to the back-end system 108 by the secure application program using the established secure communication channel. In step 326, the back-end system may receive the enciphered payment credentials. In step 328, the back-end system may decipher the payment credentials and initiate processing of a payment transaction, which may include the deciphered payment credentials and any other transaction data that may be submitted by the computing device 102, which may be included with the enciphered payment credentials or in a separate transmission to the back-end system 108. The payment transaction may be processed via a submission to an acquiring institution 110 or direct submission to a payment network 112 via the payment rails associated therewith for processing using traditional methods and systems.

Figure 4:
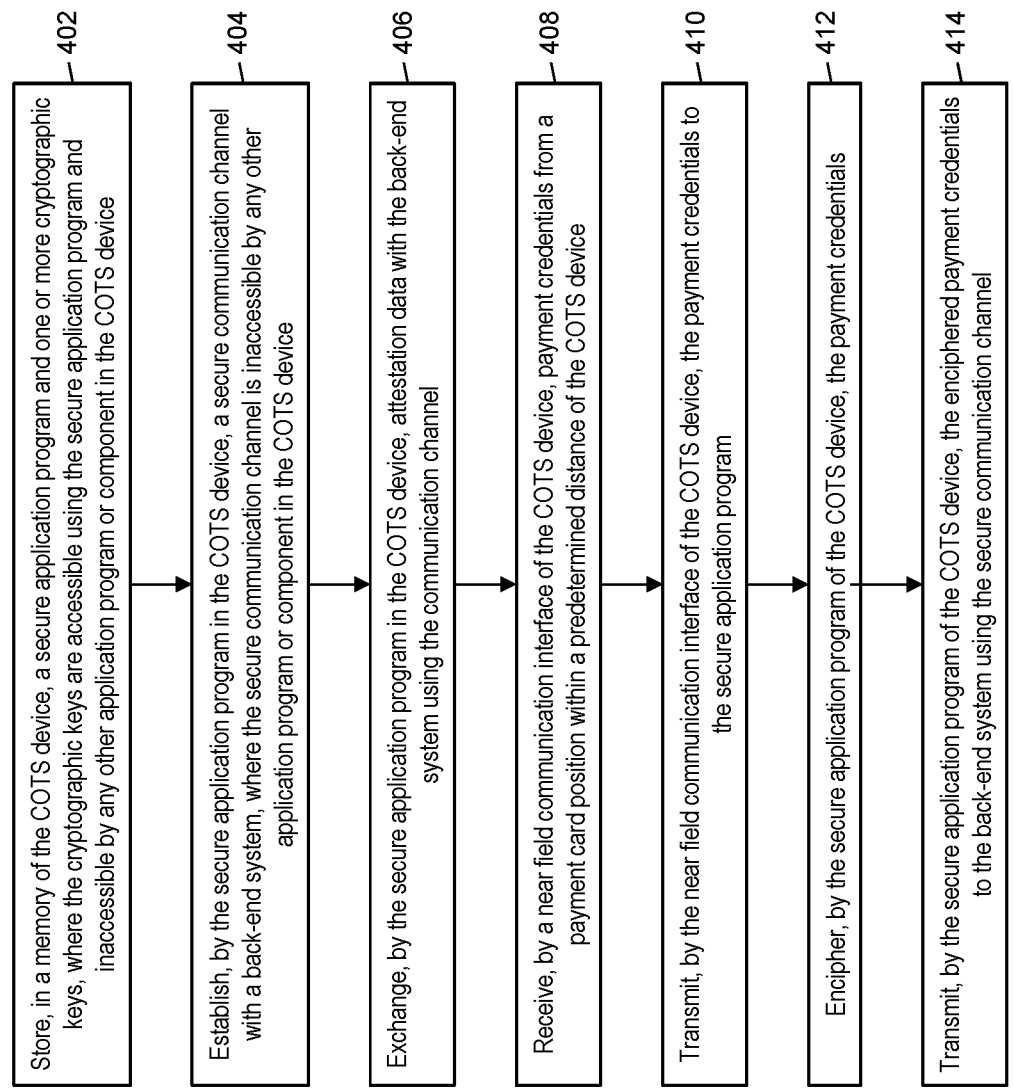
FIG. 4 is a flow chart illustrating an exemplary method for secured receipt and usage of payment credentials using a COTS device in accordance with exemplary embodiments.

Exemplary Method for Secured Receipt and Usage of Payment Credentials Using a COTS Device FIG. 4 illustrates a method 400 for the secured receipt of payment credentials via contactless transmission and usage thereof by a commercial-off-the-shelf (COTS) device via a back-end system and an established secure communication channel.

In step 402, a secure application program (e.g., secure application program 208) and one or more cryptographic keys in a memory (e.g., the memory 206) of a COTS device (e.g., the computing device 102), where the cryptographic keys are accessible using the secure application program and inaccessible by any other application program or component in the COTS device. In step 404, a secure communication channel may be established by the COTS device with a back-end system (e.g., the back-end system 108), where the secure communication channel is inaccessible by any other application program or component in the COTS device.

In step 406, attestation data may be executed by the secure application program in the COTS device with the back-end system using the communication channel. In step 408, payment credentials may be received from a payment card (e.g., the payment instrument 104) positioned with a predetermined distance of the COTS device by a near field communication (NFC) interface (e.g., the NFC interface 210) of the COTS device.

In step 410, the NFC interface of the COTS device may transmit the payment credentials to the secure application program. In step 412, the payment credentials may be enciphered by the secure application program of the COTS device. In step 414, the enciphered payment credentials may be transmitted by the secure application program of the COTS device to the back-end system using the secure communication channel.

In one embodiment, the payment credentials may be enciphered using at least one of the one or more cryptographic keys. In some embodiments, the secure application program may not cache the received and enciphered payment credentials. In one embodiment, the method 400 may further include monitoring, by the secure application program in the COTS device, for an interruption event in the COTS device; and terminating, by the secure application program in the COTS device, an executed instance of the secure application program upon detection of the interruption event, where termination of the executed instance includes deletion of received payment credentials and enciphered payment credentials. In a further embodiment, the interruption event may be at least one of: loss of focus of the secure application program, pausing of the secure application program, screen capture of the COTS device, interaction with the near field communication interface of the COTS device by any other application program or component in the COTS device; and activation of a sensor in the COTS device.

In some embodiments, the method 400 may also include: storing, in the memory of the COTS device, an audit log for the secure application program; and updating, by the secure application program of the COTS device, the audit log for the establishing, exchanging, transmitting, and enciphering steps. In one embodiment, the secure application program may be stored in a trusted execution environment in the memory of the COTS. In some embodiments, the near field communication interface may only be accessible using the secure application program and inaccessible by any other application program or component in the COTS device.

Computer System Architecture

Figure 5:
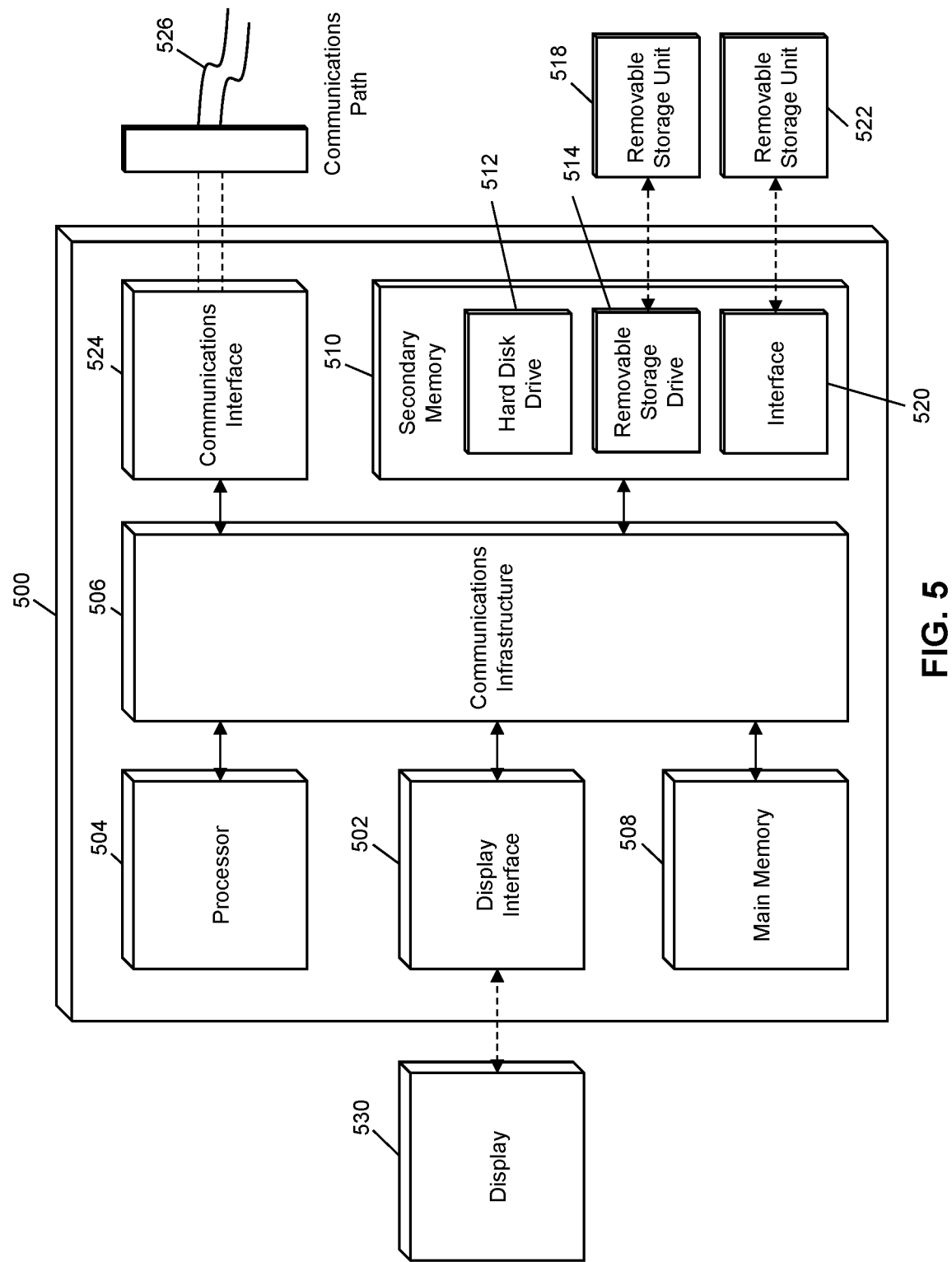
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the computing device 102 and back-end system of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for secure receipt and usage of payment credentials using a commercial-off-the-shelf device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for secured receipt and usage of payment credentials using a commercial-off-the-shelf (COTS) device, comprising:

Installing, by the COTS device, a secure application program thereon, said secure application program being configured to communicate with a back-end system;

storing, in a memory of the COTS device, the secure application program and one or more cryptographic keys, where the one or more cryptographic keys are accessible using the secure application program and inaccessible by any other application program or component in the COTS device;

monitoring, by the secure application program in the COTS device, for an interruption event in the COTS device;

establishing, by the secure application program in the COTS device, a secure communication channel with the back-end system where an attestation is performed upon establishing the secure communication channel, wherein (i) said secure communication channel is not accessible by the any other application program or component in the COTS device, and (ii) any attempted use of the secure communication channel by the any other application program or component in the COTS device detected by said monitoring is interpreted as the interruption event, resulting in immediate termination of the instance of the secure application program and the secure communication channel;

receiving, by a near field communication interface of the COTS device, payment credentials from a payment card positioned within a predetermined distance of the COTS device;

transmitting, by the near field communication interface of the COTS device, the payment credentials to the secure application program, wherein the near field communication interface is prohibited from conveying the payment credentials to the any other application program or component in the COTS device;

responsive to receiving, by the secure application program in the COTS device, the payment credentials from the near field communication interface, transmitting, by the secure application program in the COTS device, establishing data toward the back-end system via the secure communication channel with the back-end system;

responsive to establishing the secure channel with the back-end system:
exchanging, by the secure application program in the COTS device, attestation data with the back-end system using the secure communication channel;
enciphering, by the secure application program in the COTS device, the payment credentials received by the near field communication interface of the COTS device using the one or more cryptographic keys stored in the memory of the COTS device; and
transmitting, by the secure application in the COTS device, the enciphered payment credentials to the back-end system using the secure communication channel.

2. The method of claim 1, wherein the secure application program does not cache the received and enciphered payment credentials.

3. The method of claim 1, further comprising:
terminating, by the secure application program in the COTS device, an executed instance of the secure application program upon detection of the interruption event, where termination of the executed instance includes deletion of received payment credentials and enciphered payment credentials.

4. The method of claim 3, wherein the interruption event is at least one of: loss of focus of the secure application program, pausing of the secure application program, screen capture of the COTS device, interaction with the near field communication interface of the COTS device by the any other application program or component in the COTS device, and activation of a sensor in the COTS device.

5. The method of claim 1, further comprising:
storing, in the memory of the COTS device, an audit log for the secure application program; and updating, by the secure application program in the COTS device, the audit log for the establishing, exchanging, transmitting, and enciphering steps.

6. The method of claim 1, wherein the secure application program is stored in a trusted execution environment in the memory of the COTS device.

7. The method of claim 1, wherein the near field communication interface is only accessible using the secure application program and inaccessible by the any other application program or component in the COTS device.

8. A system for secured receipt and usage of payment credentials using a commercial-off-the-shelf (COTS) device, comprising:
a back-end system; and
the COTS device, where the COTS device includes a memory and a near field communication interface and installs a secure application program thereon, said secure application program being configured to communicate with the back-end system, wherein
the memory of COTS device stores the secure application program and one or more cryptographic keys, where the one or more cryptographic keys are accessible using the secure application program and inaccessible by any other application program or component in the COTS device;
the secure application program in the COTS device
monitors for an interruption event in the COTS device, and
establishes a secure communication channel with the back-end system where an attestation is performed upon establishing the secure communication channel, wherein (i) said secure communication channel is not accessible by the any other application program or component in the COTS device, and (ii) any attempted use of the secure communication channel by the any other application program or component in the COTS device detected by said monitoring is interpreted as the interruption event, resulting in immediate termination of the instance of the secure application program and the secure communication channel;
the near field communication interface of the COTS device
receives payment credentials from a payment card positioned within a predetermined distance of the COTS device, and
transmits the payment credentials to the secure application program, wherein the near field communication interface is prohibited from conveying the payment credentials to the any other application program or component in the COTS device; and
the secure application program in the COTS device
responsive to receiving the payment credentials from the near field communication interface, transmits establishing data toward the back-end system via the secure communication channel with the back-end system, and
responsive to establishing the secure channel with the back-end system:
exchanges attestation data with the back-end system using the secure communication channel,
enciphers the payment credentials received by the near field communication interface of the COTS device using the one or more cryptographic keys stored in the memory of the COTS device, and transmits the enciphered payment credentials to the back-end system using the secure communication channel.

9. The system of claim 8, wherein the secure application program does not cache the received and enciphered payment credentials.

10. The system of claim 8, wherein the secure application program in the COTS device terminates an executed instance of the secure application program upon detection of the interruption event, where termination of the executed instance includes deletion of received payment credentials and enciphered payment credentials.

11. The system of claim 10, wherein the interruption event is at least one of: loss of focus of the secure application program, pausing of the secure application program, screen capture of the COTS device, interaction with the near field communication interface of the COTS device by the any other application program or component in the COTS device, and activation of a sensor in the COTS device.

12. The system of claim 8, wherein
- the memory of the COTS device stores an audit log for the secure application program, and
- the secure application program in the COTS device updates the audit log for the establishing, exchanging, transmitting, and enciphering steps.

13. The system of claim 8, wherein the secure application program is stored in a trusted execution environment in the memory of the COTS device.

14. The system of claim 8, wherein the near field communication interface is only accessible using the secure application program and inaccessible by the any other application program or component in the COTS device.

* * * * *